United States Patent
Musgrove et al.

(10) Patent No.: US 7,363,214 B2
(45) Date of Patent: Apr. 22, 2008

(54) SYSTEM AND METHOD FOR DETERMINING QUALITY OF WRITTEN PRODUCT REVIEWS IN AN AUTOMATED MANNER

(75) Inventors: Timothy A. Musgrove, Morgan Hill, CA (US); Robin Walsh, San Francisco, CA (US)

(73) Assignee: CNET Networks, Inc., San Francisco, CA (US)

( * ) Notice: Subject to any disclaimer, the term of this patent is extended or adjusted under 35 U.S.C. 154(b) by 978 days.

(21) Appl. No.: 10/636,966

(22) Filed: Aug. 8, 2003

(65) Prior Publication Data

US 2005/0034071 A1 Feb. 10, 2005

(51) Int. Cl.
G06F 17/27 (2006.01)

(52) U.S. Cl. .............................. 704/9; 704/1
(58) Field of Classification Search ................ 704/9, 704/1, 10
See application file for complete search history.

(56) References Cited

U.S. PATENT DOCUMENTS

| 5,361,353 | A | | 11/1994 | Carr et al. |
| 5,708,822 | A | | 1/1998 | Wical |
| 5,778,397 | A | * | 7/1998 | Kupiec et al. ............... 715/500 |
| 5,867,799 | A | | 2/1999 | Lang et al. |
| 5,983,170 | A | | 11/1999 | Goodman |
| 6,026,410 | A | | 2/2000 | Allen et al. |
| 6,356,864 | B1 | | 3/2002 | Foltz et al. |
| 6,366,759 | B1 | | 4/2002 | Burstein et al. |
| 6,542,888 | B2 | | 4/2003 | Marques |
| 6,766,287 | B1 | * | 7/2004 | Kupiec et al. ................. 704/9 |
| 6,978,274 | B1 | * | 12/2005 | Gallivan et al. ............. 707/102 |
| 7,120,613 | B2 | * | 10/2006 | Murata ......................... 706/12 |
| 7,165,024 | B2 | * | 1/2007 | Glover et al. .................. 704/9 |
| 2003/0031966 | A1 | | 2/2003 | Robinson |
| 2004/0225651 | A1 | | 11/2004 | Musgrove et al. |

FOREIGN PATENT DOCUMENTS

WO    WO 03/007200    1/2003

OTHER PUBLICATIONS

Dale, et al.; "Dynamic Document Delivery: Generating Natural Language Texts on Demand", 6 pages.
International Search Report, PCT/US04/19240, Aug. 31, 2006.
Written Opinion of the International Searching Authority, Aug. 31, 2006.

* cited by examiner

*Primary Examiner*—Tālivaldis Ivars Šmits
*Assistant Examiner*—Lamont Spooner
(74) *Attorney, Agent, or Firm*—Marc S. Kaufman; Nixon Peabody LLP

(57) ABSTRACT

A system and method for determining quality of written product reviews to distinguish the user reviews for further use or processing. In one embodiment, the opinion analyzer system includes a processor, a parser module, an prose analyzer module, a characteristic features database, and a language value rules database. In another embodiment, the method comprises the steps of parsing language of a portion of a user review, extracting characteristic feature from the user review, determining a quality parameter based on the extracted characteristic feature, determining a raw score based on the quality parameter, and determining quality of the user review based on the raw score.

72 Claims, 2 Drawing Sheets

US 7,363,214 B2

SYSTEM AND METHOD FOR DETERMINING QUALITY OF WRITTEN PRODUCT REVIEWS IN AN AUTOMATED MANNER

BACKGROUND OF THE INVENTION

1. Field of the Invention

The present invention is directed to a system and method for determining quality of written user reviews or professional reviews of products or services. In particular, the present invention is directed to a system and method that allows determination of the quality of user reviews in an automated manner so that user reviews may be distinguished from each other for further use or processing.

2. Description of Related Art

Many different products and services are provided from product and service vendors. For example, manufacturers of a particular category of product offer various models in their product line, each model targeting a particular group of users and/or meeting the specific needs of a market segment. In particular, manufacturers of automobiles, vacuum cleaners, cameras, computers, etc., all generally manufacture a variety of models of their products. In many instances, each model from each manufacturer and models from differing manufacturers have different features and/or attributes.

For example, in the product category of vacuum cleaners, various models having different combinations of features and/or attributes are presently available. These features and/or attributes for vacuum cleaners include bag/bagless operation, motor power, attachments, exhaust filtration, price, etc. In another example, for the product category of digital cameras, features and/or attributes include optical and digital zoom capability, pixel count, the presence, type and size of a view screen, flash capacity, memory capacity, price, etc.

Of course, this is also applicable to providers of services as well in that they typically provide numerous different services in their field. Such providers of services may include telecommunications companies such as wireless service providers, utilities such as cable and satellite broadcast providers, travel companies including airlines, cruise lines and travel agencies, etc.

In the products arena, the vast number of manufacturers and models available for each product category, and the disparity in features and/or attributes between the products of a product category, can make a consumer's purchasing decision very difficult. Of course, analogous difficulties would be encountered by consumers of services as well.

Companies such as CNET Networks, Inc. (hereinafter "CNET") which operates www.cnet.com™ provide information regarding consumer and technology oriented products such as electronics and computer products for buyers, sellers, and suppliers of technology, as well as any other interested user. In addition to providing raw data and information, many different products in a particular product category are evaluated by editors of CNET for various features and/or attributes and rated. Moreover, the editors often provide written narrative product summaries that highlight various features of the particular product, and discuss strengths and weaknesses of the reviewed product in comparison to other comparable products. The information and narrative product summaries provided by CNET and others regarding various products in a product category may be used by consumers to facilitate potential purchase decisions.

Due to the large number of products available in the market place, providing information and narrative product summaries for all of the products that are available can be very costly. In addition, actual user's experience with a particular product or service may be different than the experiences of the editors that provide such product reviews and summaries.

Various websites provide forums for users to review the various products, merchants from which these products can be purchased, and/or services. For example, the website www.eopinions.com™ allows users of various products to provide reviews and opinions regarding products and services identified in various categories. Moreover, websites such as www.mysimon.com™ and www.yahoo.com™ provide shopping links and search features which allows a consumer to purchase products from one or more on-line merchants. These websites further provide links to allow actual users of the products to provide their review, and allows potential consumers to view these reviews.

Consequently, the user reviews that are provided by actual consumers of products and services further provide valuable information which can be used by consumers to facilitate potential purchase decisions. Moreover, the user's opinion information that is provided in such user reviews contain information regarding consumer experience with the product or service being reviewed which is very valuable to the product manufacturers and/or service provider.

Article entitled "Mining the Peanut Gallery: Opinion Extraction and Semantic Classification of Product Reviews" by Dave et al. discloses a method for automatically distinguishing between positive and negative reviews regarding a particular product by focusing on the semantic orientation of words in the review. This reference is primarily directed to the determination of whether a particular review of a product is positive or negative, and does not address whether a particular review is of high or low quality and helpfulness.

However, the user reviews vary significantly in their quality and their helpfulness, whether the review is positive or negative. Whereas one user review may provide valuable, well phrased opinions of a user regarding a product, other reviews may be poorly written and not be very helpful. Some websites such as www.amazon.com™ further allows the readers of the user reviews to rate the reviews viewed, for example, as being helpful or not helpful. However, there are no known methods or systems for facilitating substantially automated synthesis and/or analysis of the opinion information that is provided in such user reviews so as to allow determination of the quality of user reviews so that user reviews of varying quality can be distinguished from one another for further use or processing.

Therefore, there exists an unfulfilled need for methods and systems for facilitating synthesis and/or analysis of the opinion information that is provided in user reviews. In particular, there exists an unfulfilled need for such methods or systems that facilitates determination of the quality of user reviews so that user reviews can be distinguished for further use or processing.

SUMMARY OF THE INVENTION

In view of the foregoing, one aspect of the present invention is a method for determining quality of user reviews to distinguish the user reviews for further use or processing. In accordance with one embodiment, the method comprises the steps of parsing text of at least a portion of a user review, extracting at least one characteristic feature from the user review that is indicative of quality of the user review, determining at least one quality parameter for the user review based on the extracted characteristic feature, determining a raw score for the at least one quality parameter, and determining quality of the user review based on the raw score.

Another aspect of the present invention is a system for determining quality of user reviews to distinguish the user reviews for further use or processing. In one embodiment, the system comprises a processor, a parser module adapted to parse text of at least a portion of a user review and to extract a characteristic feature indicative of the quality of the user review, and a prose analyzer module adapted to determine at least one quality parameter based on the characteristic feature, determine a raw score for the at least one quality parameter, and to determine quality of the user review based on the raw score.

Yet another aspect of the present invention is a computer readable medium for determining quality of user reviews to distinguish the user reviews for further use or processing. In one embodiment, the medium comprises instructions for parsing text of at least a portion of a user review, instructions for extracting at least one characteristic feature from the user review that is indicative of quality of the user review, instructions for determining at least one quality parameter for the user review based on the extracted characteristic feature, instructions for determining a raw score for the at least one quality parameter, and instructions for determining quality of the user review based on the raw score.

These and other aspects of the present invention will become more apparent from the following detailed description of the embodiments of the present invention when viewed in conjunction with the accompanying drawings.

DETAILED DESCRIPTION OF THE PREFERRED EMBODIMENT

Figure 1:
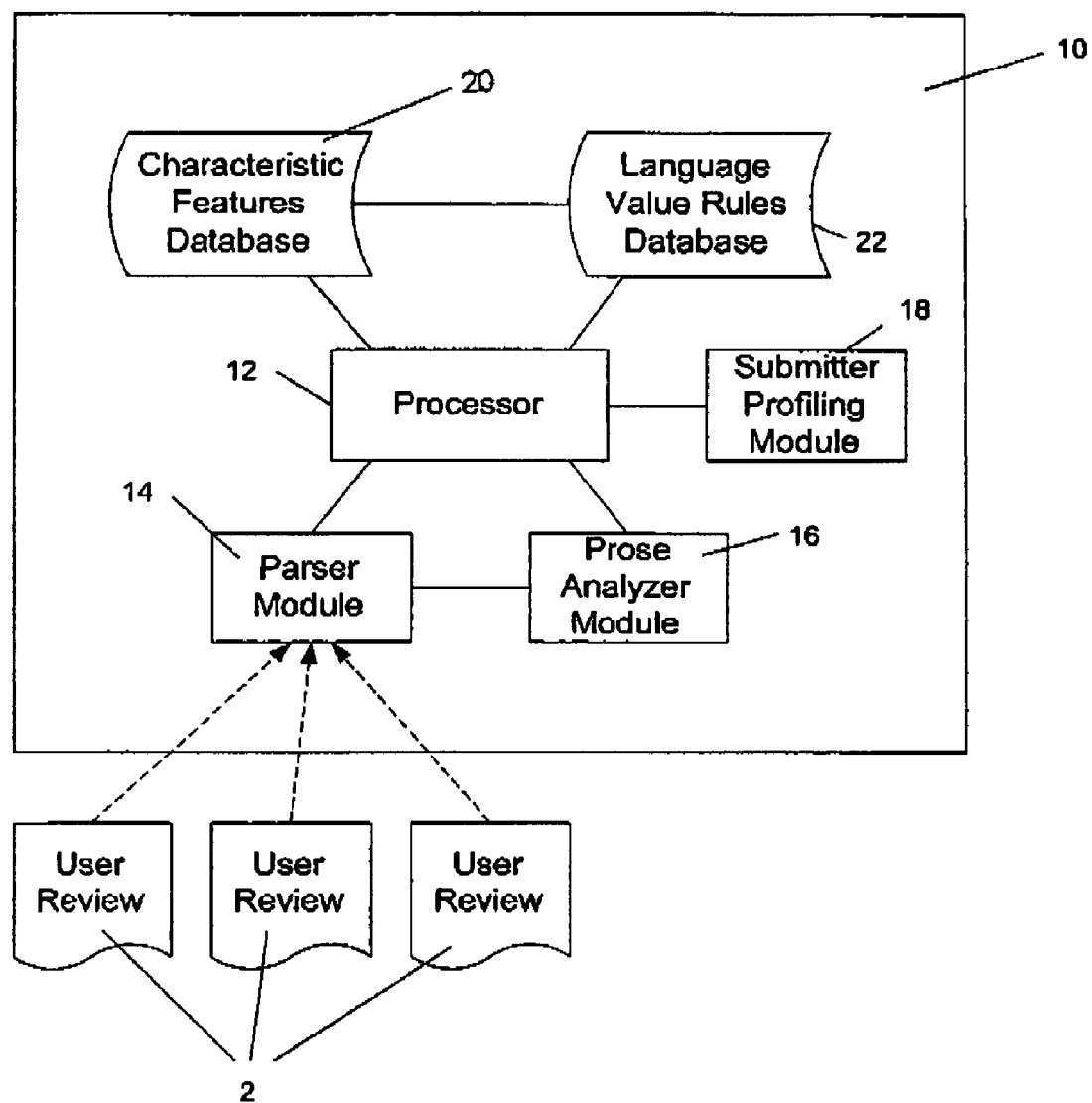
FIG. 1 is a schematic illustration of an opinion analyzer system for determining the quality of user reviews in accordance with one embodiment of the present invention.

FIG. 1 shows a schematic illustration of an opinion analyzer system 10 for determining the quality of written product reviews in accordance with one embodiment of the present invention. As will be evident from the discussions set forth herein below, the opinion analyzer system 10 is adapted to substantially automatically determine the quality of user reviews. The present invention allows high quality user reviews to be distinguished from poor quality user reviews so that further use and/or processing of the user reviews is facilitated.

Initially, as used herein and claimed, the term "user review" and variations thereof, should be understood to broadly mean any written product review or prose text with the primary thematic focus is to offer an evaluative opinion on a product, regardless of the status of the reviewer that generated the user review. For example, the user review may be a written product review from the actual user of the product such as the reviews provided in www.eopinions.com™ previously noted. The user review may also be a written product review that are written by professionals whose occupation is to write reviews or opinion columns relating to new products in the marketplace. Furthermore, the user review may be snippets from Forum discussion "threads", etc.

Moreover, it should also be noted that the opinion analyzer system 10 is described herein below as analyzing product user reviews, it should be understood that the opinion analyzer system 10 may be used to analyze user reviews regarding services as well. Thus, the term "product" and variations thereof, should be construed and understood herein to encompass services.

The opinion analyzer system 10 of the illustrated embodiment includes a processor 12 that is connected to a parser module 14, prose analyzer module 16, a submitter profiling module 18, a characteristic features database 20, and a language value rules database 22, the functions of each of these components being described in further detail below. The processor 12 of the opinion analyzer system 10 is provided to fulfill processing requirements of the parser module 14, the prose analyzer module 16, and the submitter profiling module 18.

The opinion analyzer system 10 of FIG. 1 may be implemented with any type of hardware and/or software, and may be a pre-programmed general purpose computing device. For example, the opinion analyzer system 10 may be implemented using a server, a personal computer, a portable computer, a thin client, or any suitable device or devices. The opinion analyzer system 10 and/or components of the opinion analyzer system 10 may be a single device at a single location or multiple devices at a single, or multiple, locations that are connected together using any appropriate communication protocols over any communication medium such as electric cable, fiber optic cable, or in a wireless manner.

It should also be noted that the opinion analyzer system 10 in accordance with one embodiment of the present invention is illustrated and discussed herein as having a plurality of modules and databases which perform particular functions. It should be understood that these modules and databases are merely schematically illustrated based on their function for clarity purposes only, and do not necessary represent specific hardware or software. In this regard, these modules and/or databases may be hardware and/or software implemented to substantially perform the particular functions explained. Moreover, the modules and/or databases may be combined together within the opinion analyzer system 10, or divided into more components based on the particular function desired. Thus, the present invention as schematically embodied in FIG. 1 should not be construed to limit the opinion analyzer system 10 of the present invention.

The parser module 14 of the opinion analyzer system 10 in accordance with the illustrated embodiment is adapted to parse through at least portions of one or more user reviews 2. The user reviews 2 may be electronic documents or files containing the opinions of a user regarding a product that is being reviewed. The parser module 14 extracts "characteristic features" from the user reviews 2 which are indicative of quality of the user reviews 2. In this regard, the parser module 14 accesses the characteristic features database 20 that stores the various characteristic features in various files as described in further detail below.

The parser module 14 in accordance with one embodiment may be adapted to require particular conditions to be met by the text pattern extracted from the user review before determining that the extracted text pattern is a characteristic feature. For example, the parser module 14 may specify that certain text, or variations thereof, be present within a predetermined number of words of the characteristic feature. The text patterns in the user review 2 that are extracted are analyzed by the prose analyzer module 16 to determine whether, the characteristic features are rule text patterns that is positively or negatively critical, nullifier text patterns, enhancer text patterns, comparative text patterns, experiential text patterns, or jargon text patterns, as previously described, or some other characteristic feature.

Characteristic features may be text or character strings and/or patterns (collectively referred to herein as text patterns) that are indicative of the quality of the user's review for the product being reviewed. The text pattern may be a wildcard based pattern having one or more wildcards therein to allow variations and inflections within the text pattern. The characteristic features database 20 may comprise a plurality of files for storing categories of characteristic features that are indicative of the quality of the user's review. For example, the characteristic features database 20 may be provided with a rules file that contains positively critical text patterns indicating that the user is pleased with, or otherwise satisfied with, the product being reviewed. Such rule text patterns may include, for example, "good", "outstanding", "better", etc. The rules file may further contain negatively critical text patterns indicating that the user is displeased with, or otherwise dissatisfied with the product being reviewed, together with negative values associated with the with the text patterns which indicate the degree of displeasure or dissatisfaction. Such rule text patterns may include, for example, "bad", "poor", "worse", etc.

The characteristic features database 20 may also include a nullifier file which contains nullifier text patterns that nullify the effect of positively or negatively critical text patterns. For example, the nullifier file may include text patterns such as "not", "instead of", etc. The characteristic features database 20 may further include an enhancers file in which enhancer text patterns are stored. The enhancer text patterns magnify the effect of positively or negatively critical text patterns and may include, for example, "very", "highly", "especially", etc. Alternatively, or in addition thereto, the characteristic features database 20 may further include a comparativeness file in which comparative text patterns indicating a comparison between product or service reviewed by the user review 2, and another comparable product or service are stored. Such text patterns may include, for example, "comparison", "contrast", etc. The comparativeness file may also include brand names and/or models of the another comparable product.

Furthermore, the characteristic features database 20 may also include an experience file in which experience text patterns indicating actual experience in usage of product reviewed by the user review are stored. Such text patterns may include, for example, "use", "experience", "application", etc. Moreover, the characteristic features database 20 may also include a jargon file in which jargon text patterns that are considered to be jargons for the category of products of the user review are stored. For example, the text pattern "Zebra stripes" may be associated with the product category of camcorders and stored in the jargon file.

Of course, the above noted and described characteristic features are merely examples thereof, and characteristic features may be any text patterns that are indicative of the quality of the user's opinion. Moreover, not all of the above discussed characteristic features need be provided and/or used in other embodiments of the present invention. However, utilizing the characteristic features noted would enhance accurate determination of the quality of the user review 2. In addition, in the above example, the characteristic features are stored in various files in the characteristic features database 20 that is connected to, and accessed by, the parser module 14 via the processor 12 of the opinion analyzer system 10. However, it should be noted that the characteristic features may stored in any appropriate manner, for example, as a list of text patterns in the characteristic features database 20.

In accordance with the present embodiment, the prose analyzer module 16 of the opinion analyzer system 10 analyzes the characteristic feature to allow determination of the quality of the user review 2. For instance, the prose analyzer module 16 determines the number of occurrences for each characteristic feature in the user review. The prose analyzer module 16 also determines various quality parameters that are indicative of the quality of the user reviews 2 being evaluated based on the characteristic features.

In particular, in the illustrated embodiment, the prose analyzer module 16 is adapted to determine a "positive parameter" which is the total number of positively critical text patterns, and a "negative parameter" which is negatively critical text patterns in the user review 2 being analyzed.

Using the determined positive parameter and negative parameter, the prose analyzer module 16 in accordance with the present embodiment further determines a "balance" parameter for the user review which provides an indication of whether the user review is excessively positive or excessively negative. The balance parameter may be determined by calculating the difference between number of positively critical text patterns of the user review, and number of negatively critical text patterns of the user review. The balance parameter provides an indication of any bias of the review who wrote the user review.

The prose analyzer module 16 in accordance with the present embodiment is also be adapted to determine a "depth" parameter which provides an indication of the substantive quality of the user review 2 being evaluated. The depth parameter may be determined by calculating a minimum of the absolute values of the positive parameter of the user review (i.e. the number of positively critical text patterns), and the negative parameter of the user review (i.e. the number of negatively critical text patterns).

In addition, the prose analyzer module 16 determines the "comparativeness" parameter by calculating the number of comparative text patterns in the user review that are represented in the comparativeness file of the characteristic features database 20. Thus, the comparativeness parameter would provide an indication of the quantity of text patterns that are in the user review being analyzed as compared to discussion of other products, models, etc.

Furthermore, an "experience" parameter is determined by the prose analyzer module 16 by calculating the number of experiential text patterns in the user review that are represented in the experiential file of the characteristic features database 20. Thus, the experience parameter provides an indication of the quantity of text patterns that are in the user review being analyzed which indicate ownership, experience, or use of the product being analyzed.

A "richness" parameter may also be determined by the prose analyzer module 16 for the user review being analyzed, this parameter being indicative of how much actual review information is provided in the user review. In one implementation, the richness parameter may be determined by calculating a sum of the positively critical text patterns, negatively critical text patterns, comparative text patterns, and experiential text patterns.

Moreover, the prose analyzer module 16 may be further adapted to determine a "verbosity" parameter which provides an indication of the quality of the user review as compared to its length. This verbosity parameter may be determined by calculating ratio of the richness parameter to the total length of the user review.

A "conciseness" parameter may also be calculated by the prose analyzer module 16 which provides an indication of whether the user review is concisely reviewing the product in the user review or the review is unnecessarily long. The conciseness parameter may be determined by calculating how close the length of the user review approximates a predetermined ideal length for a user review.

In addition, a "focus" parameter may be calculated which provides an indication of the extent to which the user review focuses mainly on the product being reviewed, instead of on other topics, for example, comparative products. The focus parameter may be determined by calculating the length of the user review that actually discusses the product being reviewed in proportion to the length of the user review that does not actually discuss the product being reviewed.

Further, the prose analyzer module 16 may be adapted to determine a "grammar" parameter that is indicative of the extent to which the user review avoids grammatical errors. This provides an indication of whether the reviewer was careful or careless during the generation of the user review being analyzed. The grammar parameter may be implemented using any standard grammar checking method known in the art.

Finally, the prose analyzer module 16 of the present embodiment is also adapted to determine a "jargon" parameter which is indicative of the extent to which the user review utilizes jargon that is related to the product. The jargon parameter may be simply determined by counting the number of jargon text patterns in the user review that are stored in the jargon file for the category of products of the characteristic features database 20.

Based on the above described quality parameters, the prose analyzer module 16 in accordance with the present embodiment calculates a raw score for each of the quality parameters of the user review being analyzed. In particular, the prose analyzer module 16 calculates a raw score for balance, depth, comparativeness, experience, richness, verbosity, conciseness, focus, grammar, and jargon parameters. For certain quality parameters, the raw scores may merely be the actual number of characteristic features that are present in the particular user review being analyzed. For other quality parameters, the raw scores may be a processed value derived from various characteristic features for each of the quality parameters.

However, in accordance with one preferred embodiment of the present invention, the raw score for various quality parameters are calculated bases on rule-based point assignments from the language value rule database 22. The language value rule database 22 includes various rules specifying keywords, phrases, and expressions that specify an antecedent condition which, if found, triggers the prose analyzer module 16 to assign a tentative number of points (positive or negative) to each of the characteristic features for each of the quality parameters.

For example, regarding the experience parameter, rules of the language value rule database 22 may specify "I ? used |+3" which instructs the prose analyzer module 16 to assign +3 points if the text pattern occurs where "I" and "used" is present, together with any word therein between, as represented by "?". In another example, regarding the experience parameter, rules of the language value rule database 22 may also specify "my ? experience |+2" which instructs the prose analyzer module 16 to assign +3 points if this text pattern occurs. Typically, many rules would be stored in the language value rule database 22 for each of the characteristic features of each of the quality parameters, rules preferably including verbal stemming and other syntactic options. Of course, the point assignment as described above is merely one example and any other point assignment methods may be used for the various quality parameters. For example, various look up tables and/or equations for deriving the point assignments may be provided.

The points which are assigned to the various quality parameters for each of the characteristic features may be diminished or increased by the prose analyzer module 16 based on the presence of a nullifier text pattern or an enhancer text pattern. As previously described, enhancer text patterns and nullifier text patterns indicate the reduction or intensification of degree in the content of positively or negatively critical text patterns. For example, "hardly" may be a nullifier text pattern and "extremely" may be an enhancer text pattern. Thus, if the characteristic feature "fast flash" for a camera results in assignment of +2 points, the presence of the text pattern "extremely" before the characteristic feature may result in an additional +1 point for this characteristic feature. Conversely, the presence of the text pattern "hardly" may result in diminishing the assigned points by −1 or −2.

Moreover, a fall-off factor may be used by the prose analyzer module 16 to decrease the raw score for a particular quality parameter if there are repetitive instances of a particular text pattern. This allows the prose analyzer module 16 to take into consideration, whether the reviewer of the user review 2 being analyzed is overly zealous in his/her opinion regarding the product. In particular, the fall-off factor may be used to diminish points assigned to a particular characteristic feature when the user review is repetitive, or uses repetitive nullifier text patterns and/or repetitive enhancer text patters.

For example, "very, very, very fast flash" which is a characteristic feature that has three enhancer text patterns, each repetitive instance of the enhancer text pattern "very" enhances the point assigned to the characteristic feature by a reduced amount so that there will be increasing less enhancement effect. By decreasing the raw score for repeated instances of a characteristic feature, the affects of such user bias on the determination of the user review's quality is minimized. In accordance with one implementation, the fall-off value may be between zero and one and multiplied by itself for each repeated instance. Thus, in the above example, if the fall-off value is 0.5, then the second occurrence of the enhancer text pattern "very" will increase the assigned points for the characteristic feature by 50% of the increase caused by the first instance of the same enhancer text pattern. Similarly, the third instance of the enhancer text pattern will increase the assigned points for the characteristic feature by 25% (since 0.5×0.5=0.25).

Furthermore, in accordance with one embodiment of the present invention, a predetermined ideal raw score is provided for each of the quality parameters, together with a predetermined high differential value, and a predetermined low differential value. The prose analyzer module 16 determines a functional score for each of the quality parameters based on the raw score and the predetermined ideal raw score, as well as the predetermined high and low differential values.

In particular, the functional score is determined in the present embodiment by the prose analyzer module 16 by calculating the difference between the raw score and the predetermined ideal raw score. If the calculated difference is zero (i.e. raw score for the quality parameter of a user review 2 corresponds to the ideal raw score), the prose analyzer module 16 assigns a functional value, for example, one point. The prose analyzer module 16 assigns a zero functional value (zero points) if the calculated difference is below the predetermined low differential value, and also assigns a zero functional value (zero points) if the calculated differential value is above the predetermined high differential value.

Furthermore, the prose analyzer module 16 is adapted to calculate and assign an apportioned functional value if the calculated difference between the raw score and the idealized raw score is greater than zero, but is between the predetermined low differential value and the predetermined high differential value. The apportioned functional value may be apportioned in any appropriate manner. For example, in accordance with one implementation, the apportioned functional value is apportioned proportionately based on the raw score relative to the predetermined idealized raw score and the predetermined high differential value or the predetermined low differential value. Of course, this is merely one method of apportioning the functional values, and other methods may be used in other embodiments.

Then, the prose analyzer module 16 in accordance with the illustrated embodiment of the opinion analyzer system 10 calculates the final quality score based on the functional value of the various quality parameters. Thus, the final quality score takes in to consideration, all of the various quality parameters discussed above in determining the actual quality of the user review 2 being analyzed. The final quality score may be calculated in any appropriate manner by processing the functional scores for each of the quality parameters described above. For example, in one embodiment, the functional scores of the quality parameters may be simply added or multiplied together to derive the final quality score. The final quality score may also be normalized scores on a scale of 0 to 100 relative to the final quality scores of the other user reviews 2.

Furthermore, weighing factors may be provided for each of the functional scores to allow one or more quality parameters to be emphasized or de-emphasized relative to other quality parameters. In such an implementation, the weighing factors may be multiplied together with the corresponding functional scores. The functional scores may then be added together or otherwise processed to derive the final quality score.

As can be appreciated, the use of weighing factors may be particularly useful to bias the final quality scores of user reviews based on the intended audience. For example, if a more professional and technology savvy audience is targeted, weighing factors for the jargon parameter can be increased so that the functional score associated with the jargon parameter is increased to thereby increase the final quality score of the user review. Moreover, the conciseness parameter may be emphasized so that more in-depth user reviews are favored over brief user reviews. If a novice audience is targeted, converse weighing factors may be provided. Of course, the above discussed are merely examples of methods for determining the final quality score and any appropriate methods may be used in other embodiments.

In accordance with another embodiment, the determined final quality score for the user reviews may be further modified by the submitter profiling module 18 of the opinion analyzer system 10 to increase or decrease the final quality score for the user review based on information associated with the reviewer that provided the user review, i.e. author of the review. For example, if the user providing the user review is considered to be especially knowledgeable regarding a particular category of products and/or services, the final quality score of the user review may be increased.

Such information associated with the reviewer may be the reviewer's e-mail address so that if the reviewer has a real e-mail name and address like Bob.Jones@IBM.com, the review provided by this individual may be weighed more so that the review is scored higher as compared to reviews provided by a reviewer with an anonymous e-mail name and/or address such as "Axe-Head@LoveMachine.com". In another example, the information regarding the reviewer may be obtained directly from the reviewer, for example, through various questions that may be present to the reviewer. These questions may include the duration of ownership of the product, previous experiences with similar products, whether use of the product for professional use rather than casual use, etc.

In addition, if the reviewer has provided user reviews previously which were considered to be of high quality, the user reviews from the reviewer may be favored, for example, by increasing the final quality score. Furthermore, if there are more than one user review provided by the reviewer regarding a particular product, the more recent review may be favored over the older user reviews by increasing the final quality score of the recent review. Moreover, collaborative points that provide archival data of other users of the opinion analyzer system 10 may be used to increase or decrease the final quality score for a particular user review. For example, the viewers of the particular user review may be requested to rank the user's review as either being helpful, or unhelpful. The final quality score of user reviews that are indicated by viewers to be helpful may be increased correspondingly.

Thus, the final quality score for each user review being analyzed, as determined by the opinion analyzer system 10 in the manner described above, is ultimately dependent on the characteristic features of the user review being analyzed. The determined final quality scores of each of the user reviews 2 will invariably differ from one another depending their characteristic features. This allows various user reviews 2 to be distinguished from one another so that selected user reviews can be used further or otherwise processed.

It should be clear that by variously editing and modifying the various source files described above, and/or by changing the idealized parameters, the opinion analyzer system 10 can be variously and alternatively instantiated so as to provide a different "voice" or "style" to the user opinions. For example, for a more professional or business-oriented audience, longer opinions using more jargon and which are submitted by users who are professionals, could easily be made to receive systematically higher final quality scores. For a more general consumer audience, those user reviews that are shorter, simpler, and avoid a lot of jargon, could be preferred.

For example, user reviews having a final quality score that is less than a predetermined minimum final quality score can be discarded so that such reviews do not take up resources and waste time of viewers. User reviews having a final quality score that is higher than the minimum final quality score may be further analyzed. For example, the manufacture of the product being reviewed may further analyze the user reviews to determine strengths and weaknesses of the product reviewed for further improvement in future models.

Alternatively, as noted above, the final quality scores may be normalized on a scale of 0 to 100 and the user reviews having a normalized final quality score of less than a cut-off value, 50 for example, may be discarded or suppressed while those user reviews having a normalized final quality score more than the cut-off value are further processed, or displayed, for example, to prospective consumers researching a particular product. Of course, the above are merely examples of how the final quality score may be further weighed, and other processing methods may be used in other embodiments as well.

Figure 2:
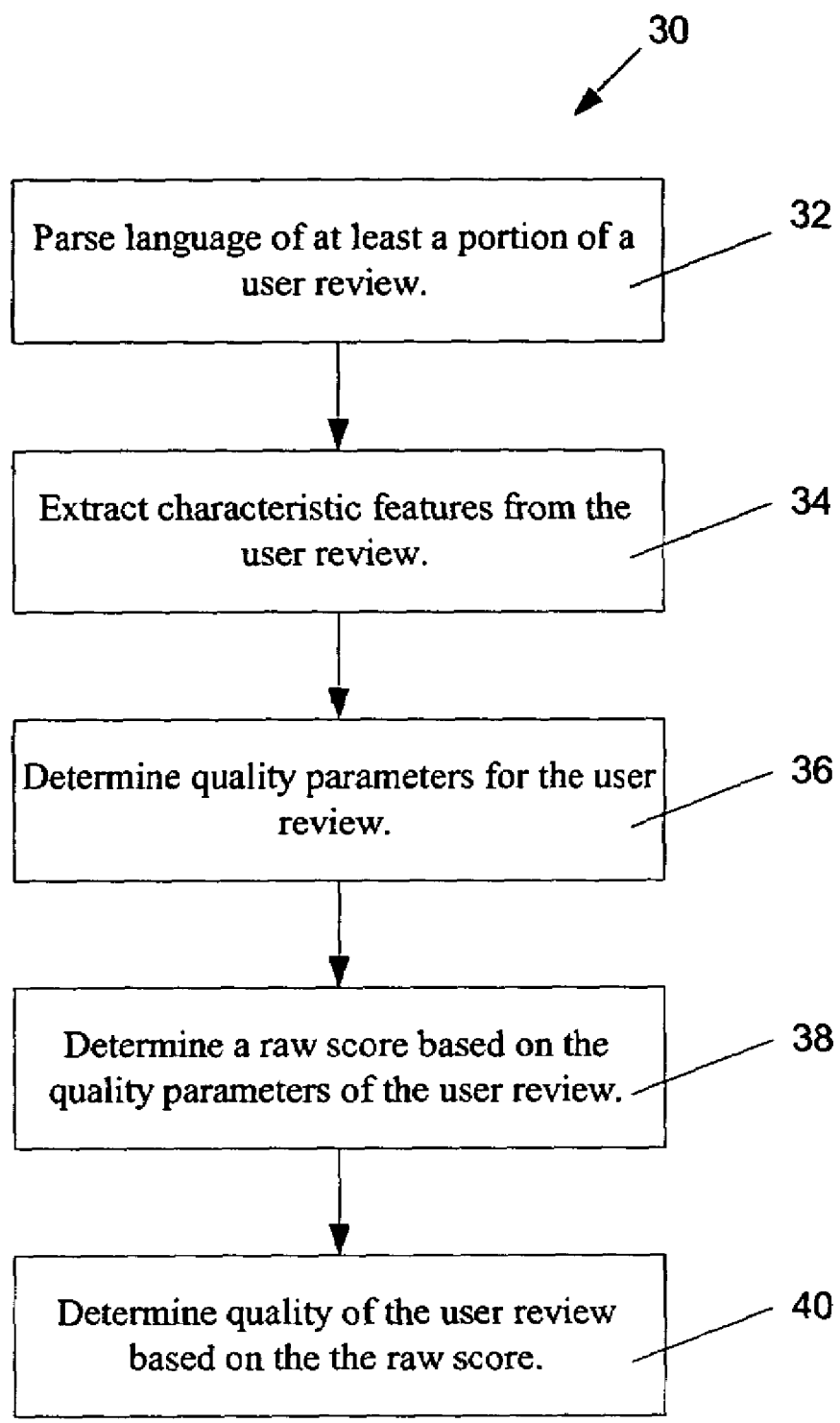
FIG. 2 is a flow diagram illustrating a method for determining the quality of user reviews in accordance with another aspect of the present invention.

Therefore, in view of the above, it should also be evident that the present invention also provides a method for determining quality of user reviews, or any other prose content, such as professional reviews, which contains opinions on products, to thereby distinguish them for further use or processing. FIG. 2 is a flow diagram 30 showing a method in accordance with one embodiment. The method comprises the step 32 in which language of at least a portion of a user review is parsed. In step 34, characteristic features are extracted from the user review that are indicative of quality of the user review. Various quality parameters are determined in step 36. In step 38, raw scores are determined for the quality parameters. Finally, in the illustrated embodiment, the method also includes step 40 in which quality of the user review is determined based on the raw score.

Of course, it should be evident that the flow diagram 30 of FIG. 2 merely shows one example method and other methods of the present invention may include additional steps. For example, the method may further include the step of providing ideal raw scores, determining functional scores based on the raw scores, and calculating a final quality score, all of which were described in detail above, and thus, are omitted herein to avoid repetition. Moreover, as also described, various quality parameters may be emphasized or de-emphasized using weighing factors. Furthermore information associated with the reviewer that provides the user review may be utilized to further modify the final quality score.

It should now be evident that the opinion analyzer and the method for determining quality of user reviews in accordance with the present invention as described above may be used to analyze user opinions regarding any products or services. In particular, the opinion analyzer of the present invention allows substantially automated analysis of user opinions so that user opinions that are of high quality can be distinguished from poor quality opinions so that further use or processing may be conducted. Moreover, the present invention also allows poor quality user opinions to be removed from websites or databases to thereby reduce system and processing requirements of websites or databases that maintain user opinions. Furthermore, it should also be evident that the present invention may be implemented as a computer software stored on a computer readable medium having instructions for implementing the method described herein.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A method for determining quality of user reviews to distinguish the user reviews for further use or processing, said method comprising the steps of:
   parsing text of at least a portion of a user review;
   extracting at least one characteristic feature from said user review that is indicative of quality of said user review;
   determining at least one quality parameter for said user review based on said extracted characteristic feature;
   determining a raw score for said at least one quality parameter;
   providing a predetermined ideal raw score;
   determining a functional score for said at least one quality parameter based at least on said raw score and said predetermined ideal raw score; and
   determining quality of said user review based on said functional score for each of said at least one quality parameter.

2. The method of claim 1, wherein said at least one characteristic feature is a text pattern.

3. The method of claim 2, wherein said text pattern is a wildcard based pattern having a wildcard therein.

4. The method of claim 1, wherein said step of determining at least one quality parameter based on said at least one characteristic feature includes determining a number of occurrences of said at least one characteristic feature.

5. The method of claim 1, wherein said step of determining said raw score for said at least one quality parameter includes the step of specifying an antecedent condition that is satisfied with a text pattern.

6. The method of claim 1, wherein said step of determining said raw score for said at least one quality parameter includes the step of counting each occurrence of said at least one characteristic feature in said user review.

7. The method of claim 1, wherein said step of determining functional score includes the step of determining the difference between said raw score and said predetermined ideal raw score.

8. The method of claim 7, wherein said step of determining functional score further includes the step of assigning a functional value if said raw score corresponds to said ideal raw score.

9. The method of claim 1, further including the step of weighing said at least one quality parameter emphasize or de-emphasize said at least one quality parameter.

10. The method of claim 1, further including the step of determining a final quality score for said user review based on said functional score of each quality parameter of said user review.

11. The method of claim 10, further including the step of weighing at least one of said at least one quality parameter emphasize or de-emphasize said quality parameter to modify said final quality score.

12. The method of claim 10, further including the step of adjusting said final quality score of said user review based on information associated with a reviewer providing said user review.

13. The method of claim 12, wherein said information associated with said reviewer is at least one of an e-mail address associated with said user, responses to a questionnaire, recency of said user review, final quality scores of previous user reviews from said reviewer, and collaborative information.

14. The method of claim 1, further including the step of providing a fall-off factor that diminishes said raw score of said at least one quality parameter when said at least one characteristic feature is repeated.

15. The method of claim 1, wherein said at least one characteristic feature of said user review is a positively critical text pattern.

16. The method of claim 1, wherein said at least one characteristic feature of said user review is a negatively critical text pattern.

17. The method of claim 1, wherein said at least one characteristic feature of said user review is a nullifier text pattern nullifying effect of at least one of an positively critical text pattern and a negatively critical text pattern.

18. The method of claim 1, wherein said at least one characteristic feature of said user review is an enhancer text pattern enhancing effect of at least one of an positively critical text pattern and a negatively critical text pattern.

19. The method of claim 1, wherein said at least one characteristic feature of said user review is a comparative text pattern.

20. The method of claim 19, wherein said comparative text pattern is at least one of a brand name and a model of said another comparable product.

21. The method of claim 1, wherein said at least one characteristic feature of said user review is an experiential text pattern indicating real experience in usage of product reviewed by said user review.

22. The method of claim 1, wherein said at least one characteristic feature is a jargon text pattern associated with a product category.

23. The method of claim 1, further including the step of determining a balance parameter of said user review by calculating the difference between number of positively critical text patterns of said user review, and number of negatively critical text patterns of said user review.

24. The method of claim 1, further including the step of determining a depth parameter of said user review by determining a minimum of the number of positively critical text patterns and the number of negatively critical text patterns of said user review.

25. The method of claim 1, further including the step of determining a comparativeness parameter of said user review by determining number of comparative text patterns.

26. The method of claim 1, further including the step of determining an experiential parameter of said user review by determining number of experiential text patterns.

27. The method of claim 1, further including the step of determining a richness parameter of said user review by calculating a sum of positively critical text patterns, negatively critical text patterns, experiential text patterns, and comparative text patterns.

28. The method of claim 1, further including the step of determining a verbosity parameter of said user review by calculating ratio of length of said user review to sum of positively critical text patterns, negatively critical text patterns, comparative text patterns, and experiential text patterns.

29. The method of claim 1, further including the step of determining a conciseness parameter of said user review by calculating length of said user review in comparison to a predetermined length.

30. The method of claim 1, further including the step of determining a focus parameter of said user review by calculating length of text that discuss product of said user review in comparison to length of text that does not discuss product of said user review.

31. The method of claim 1, further including the step of determining a grammar parameter of said user review indicative of extent to which said user review avoids grammatical errors.

32. The method of claim 1, further including the step of determining a jargon parameter of said user review indicative of the number of technical jargons used in said user review.

33. The method of claim 1, wherein said user review is directed to at least one of a product and a service.

34. A method for determining quality of user reviews to distinguish the user reviews for further use or processing, said method comprising the steps of:
 parsing text of at least a portion of a user review;
 extracting at least one characteristic feature from said user review that is indicative of quality of said user review;
 determining at least one quality parameter for said user review based on said extracted characteristic feature;
 determining a raw score for said at least one quality parameter, and providing a predetermined ideal raw score for each of said at least one quality parameter;
 determining a functional score for said at least one quality parameter based on said raw score and said predetermined ideal raw score and determining quality of said user review based on said functional score;
 wherein said step of determining functional score further includes the step of providing a predetermined high differential value, and a predetermined low differential value for said at least one characteristic feature.

35. The method of claim 34, wherein said step of determining functional score further includes the step of assigning zero value if the difference between said raw score and said predetermined ideal raw score is below said predetermined low differential value.

36. The method of claim 34, wherein said step of determining functional score further includes the step of assigning zero value if the difference between said raw score and said predetermined ideal raw score is above said predetermined high differential value.

37. The method of claim 34, wherein said step of determining functional score further includes the step of assigning an apportioned value if the difference between said raw score and said predetermined ideal raw score is above said predetermined low differential value and is below said predetermined high differential value, but is not zero.

38. The method of claim 37, wherein said apportioned value is apportioned proportionately based on said raw score relative to said predetermined idealized raw score and at least one of said predetermined high differential value and said predetermined low differential value.

39. A system for determining quality of user reviews to distinguish the user reviews for further use or processing, said system comprising:
 a processor;
 a parser module adapted to parse text of at least a portion of a user review and extract a characteristic feature of said user review that is indicative of quality of said user review; and
 a prose analyzer module adapted to determine at least one quality parameter based on said characteristic feature, determine a raw score for said at least one quality parameter, determine a functional score for said at least one quality parameter based at least on said raw score and a predetermined ideal raw score for each of said at least one quality parameter, and to determine quality of said user review based on said functional score.

40. The system of claim 39, wherein said prose analyzer module determines said raw score for said at least one quality parameter by counting each occurrence of said characteristic feature in said user review.

41. The system of claim 39, further comprising a character features database having a plurality of character features stored therein.

42. The system of claim 41, wherein said plurality of character features are a plurality of text patterns.

43. The system of claim 42, wherein at least one of said plurality of text pattern is a wildcard based pattern having a wildcard therein.

44. The system of claim 42, further comprising a language value rules database having a plurality of rules specifying point assignment values associated with said plurality of text patterns.

45. The system of claim 39, wherein said characteristic feature of said user review is at least one of a positively critical text pattern and a negatively critical text pattern.

46. The system of claim 39, wherein said characteristic feature of said user review is at least one of a nullifier text pattern and an enhancer text pattern.

47. The system of claim 39, wherein said characteristic feature of said user review is a comparative text pattern indicating a comparison between product reviewed by said user review and another comparable product.

48. The system of claim 39, wherein said characteristic feature of said user review is an experiential text pattern indicating real experience in usage of product reviewed by said user review.

49. The system of claim 39, wherein said characteristic feature of said user review is a jargon text pattern associated with a product category.

50. The system of claim 39, wherein said at least one quality parameter is a balance parameter which is the difference between number of positively critical text patterns of said user review, and number of negatively critical text patterns of said user review.

51. The system of claim 39, wherein said at least one quality parameter is a depth parameter which is a minimum of the number of positively critical text patterns and the number of negatively critical text patterns of said user review.

52. The system of claim 39, wherein said at least one quality parameter is a comparativeness parameter which is a number of comparative text patterns.

53. The system of claim 39, wherein said at least one quality parameter is an experiential parameter which is a number of experiential text patterns.

54. The system of claim 39, wherein said at least one quality parameter is a richness parameter which is a sum of positively critical text patterns, negatively critical text patterns, experiential text patterns, and comparative text patterns.

55. The system of claim 39, wherein said at least one quality parameter is a verbosity parameter which is a ratio of length of said user review to sum of positively critical text patterns, negatively critical text patterns, comparative text patterns, and experiential text patterns.

56. The system of claim 39, wherein said at least one quality parameter is a conciseness parameter which is the length of said user review in comparison to a predetermined length.

57. The system of claim 39, wherein said at least one quality parameter is a focus parameter which is the length of text that discuss product of said user review in comparison to length of text that does not discuss product of said user review.

58. The system of claim 39, wherein said at least one quality parameter is a grammar parameter indicative of extent to which said user review avoids grammatical errors.

59. The system of claim 39, wherein said at least one quality parameter is a jargon parameter indicative of the number of technical jargons used in the user review.

60. The system of claim 39, wherein said user review is directed to at least one of a product and a service.

61. A system for determining quality of user reviews to distinguish the user reviews for further use or processing, said system comprising:
   a processor;
   a parser module adapted to parse text of at least a portion of a user review and extract a characteristic feature of said user review that is indicative of quality of said user review; and
   a prose analyzer module adapted to determine at least one quality parameter based on said characteristic feature, to determine a raw score for said at least one quality parameter;
   wherein said prose analyzer module is further adapted to determine a functional score for said at least one quality parameter based on difference between said raw score and a predetermined ideal raw score for each of said at least one quality parameter, and to determine quality of said user review based on said functional score.

62. The system of claim 61, wherein said prose analyzer module is further adapted to assign an apportioned value for said at least one quality parameter if the difference between said raw score and a predetermined ideal raw score is not within a predetermined differential value.

63. The system if claim 61, wherein said prose analyzer is further adapted to allow weighing of said at least one quality parameter to emphasize or de-emphasize said quality parameter to modify said final quality score.

64. The system of claim 61, wherein said prose analyzer module is further adapted to determine a final quality score for said user review based on said functional score for each quality parameter of said user review.

65. The system of claim 64, further comprising a submitter profiling module adapted to adjust said final quality score based on information associated with a reviewer providing said user review.

66. The system of claim 65, wherein said information associated with said reviewer is at least one of an e-mail address associated with said user, responses to a questionnaire, recency of said user review, final quality scores of previous user reviews from said reviewer, and collaborative information.

67. A computer readable medium for determining quality of user reviews to distinguish the user reviews for further use or processing, said medium comprising:
   instructions for parsing text of at least a portion of a user review;
   instructions for extracting at least one characteristic feature from said user review that is indicative of quality of said user review;
   instructions for determining at least one quality parameter for said user review based on said extracted characteristic feature;
   instructions for determining a raw score for said at least one quality parameter;
   instructions for determining a function score based at least on said raw score and a predetermined ideal raw score for each of said at least one quality parameter; and
   instructions for determining quality of said user review based on said functional score.

68. The medium of claim 67, wherein said instructions for determining at least one quality parameter includes instructions for determining a number of occurrences of said at least one characteristic feature.

69. The medium of claim 67, further including instructions for determining a final quality score for said user review based on said functional score.

70. The medium of claim 69, further including instructions for weighing at least one of said at least one quality parameter emphasize or de-emphasize said quality parameter to modify said final quality score.

71. The medium of claim 69, further including instructions to allow adjustment of said final quality score of said user review based on information associated with a reviewer providing said user review.

72. The medium of claim 67, further including instructions for diminishing said raw score of said at least one quality parameter when said at least one characteristic feature is repeated.

* * * * *